United States Patent
Fang et al.

(10) Patent No.: US 8,184,889 B2
(45) Date of Patent: May 22, 2012

(54) RECONSTRUCTION SUPPORT REGIONS FOR IMPROVING THE PERFORMANCE OF ITERATIVE SPECT RECONSTRUCTION TECHNIQUES

(75) Inventors: Joseph Y. Fang, Barrington, IL (US); Manjit Ray, Hoffman Estates, IL (US); Yanhong Chu, Barrington, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 779 days.

(21) Appl. No.: 12/240,809

(22) Filed: Sep. 29, 2008

(65) Prior Publication Data
US 2009/0087062 A1    Apr. 2, 2009

Related U.S. Application Data

(60) Provisional application No. 60/995,783, filed on Sep. 28, 2007.

(51) Int. Cl.
*G06K 9/20* (2006.01)
*G06K 9/36* (2006.01)
*H05G 1/60* (2006.01)
*H05G 1/26* (2006.01)

(52) U.S. Cl. .............. 382/131; 382/128; 378/98.12; 378/162

(58) Field of Classification Search .......... 382/126, 382/131, 128; 378/4–20, 98, 98.2, 98.8, 378/98.12, 162–164, 210, 901
See application file for complete search history.

(56) References Cited

U.S. PATENT DOCUMENTS 5,390,226 A * 2/1995 Tam ............................ 378/19
6,256,404 B1 * 7/2001 Gordon et al. ............. 382/131

* cited by examiner

*Primary Examiner* — Anastasia Midkiff
(74) *Attorney, Agent, or Firm* — Peter Kendall

(57) ABSTRACT

A method for iterative reconstruction of tomographic images of an object of interest includes obtaining data corresponding to a field of view of a detector, processing the data to prepare a reconstruction support region corresponding to a region within the field of view encompassing the object, and reconstructing a tomographic image using the reconstruction support region. Preferably, the data corresponding to the field of view includes at least one of a projection image of the object, an orbit location of a detector relative to a center of rotation of the detector, or an attenuation coefficient map of the object, which data can be used to describe a reconstruction support region corresponding to the object.

16 Claims, 5 Drawing Sheets

RECONSTRUCTION SUPPORT REGIONS FOR IMPROVING THE PERFORMANCE OF ITERATIVE SPECT RECONSTRUCTION TECHNIQUES

CROSS-REFERENCE TO RELATED APPLICATIONS

This application claims benefit of under 35 U.S.C. §119 of U.S. Provisional Patent Application No. 60/995,783, filed Sep. 28, 2007, which application is incorporated herein by reference in its entirety.

FIELD OF THE INVENTION

The present invention generally relates to nuclear medicine, and systems for obtaining nuclear medicine images. More specifically, the present invention relates to methods for improving iterative tomographic reconstruction techniques in nuclear medicine imaging such as SPECT (Single Photon Emission Computed Tomography).

BACKGROUND OF THE INVENTION

Nuclear medicine is a unique medical specialty wherein radiation is used to acquire images which show the function and anatomy of organs, bones or tissues of the body. Radiopharmaceuticals are introduced into the body, either by injection or ingestion, and are attracted to specific organs, bones or tissues of interest. Such radiopharmaceuticals produce gamma photon emissions which emanate from the body and are captured by scintillation crystals with which the photons interact to produce flashes of light or events. Events are detected by one or more collimated gamma photon detectors, such as photomultiplier tubes. The detectors are typically rotated about a patient's body to obtain projection data from a number of different view angles. Using the gamma event data that is collected, three-dimensional images of the organs of the body, which have been taken up by the radiopharmaceuticals, e.g. the heart, can be reconstructed.

In the case of SPECT, iterative reconstruction of projection images typically attempts to approximate the system matrix as closely as possible in order to improve the image quality and noise characteristics of the reconstructed images. However, modeling the system matrix can be computationally prohibitive both in terms of the amount of memory required and/or the time that is required. Consequently, attempts have been made to reduce the effort required to model the system matrix, and have included the use of optimized libraries, graphics processing units (GPU), etc. However, the above-described efforts are generally unsatisfactory.

What is needed then is a method for improving iterative reconstruction techniques so as to increase computational efficiency and reduce the time required to perform such techniques.

SUMMARY OF THE INVENTION

The present invention generally comprises a method for the iterative reconstruction of tomographic images of an object of interest and includes obtaining data corresponding to a field of view of a detector, processing the data to prepare a reconstruction support region corresponding to an object within the field of view, and preparing an image based on the reconstruction support region.

In an embodiment of the method, the data corresponds to at least one of a projection image of the object of interest within the field of view, a location of the detector relative to a point, or a pre-existing image of the object of interest within the field of view.

In some embodiments a plurality of projection images of an object of interest are utilized and an object profile is prepared for each projection image. The object profiles are filtered and described according to threshold values, the object profiles are back-projected to describe a reconstruction support region corresponding to the object.

In some embodiments a plurality of view angles and distances of the detector from a point are recorded for each projection image, the projection image data within each detector view angle and distance is retained, and the retained projection image data used to describe a reconstruction support region corresponding to an object within the field of view.

In some embodiments, the pre-existing image comprises object attenuation data. The attenuation data is then processed so as to be described according to threshold values, and the attenuation data is used to describe a reconstruction support region corresponding to the object.

In some preferred embodiments, each of the reconstruction support regions described from the projection images, the detector view angles and distances from a point, and attenuation images are used to describe a combined reconstruction support region corresponding to the object.

In an embodiment of the method, for each iteration of an iterative reconstruction process, a system matrix is modified with view specific attenuations for all voxels in the reconstruction support region, support voxels provided by applying the system matrix are projected forward, projection correction is calculated as a ratio between an estimated projection and an actual projection, projection correction for voxels encompassed by the reconstruction support regions are back-projected, and the sum of the back-projected corrections are used to update the support voxels.

In some embodiments of the method, a plurality of projection images, a plurality of detector locations relative to a point, and a plurality of attenuation images are used to describe a volume encompassing the object of interest, and each of the volumes is intersected with one another to define the reconstruction support region.

BRIEF DESCRIPTION OF THE DRAWINGS

The invention will now be more fully described by way of example with reference to the accompanying drawings in which.

DETAILED DESCRIPTION OF THE INVENTION

Figure 1:
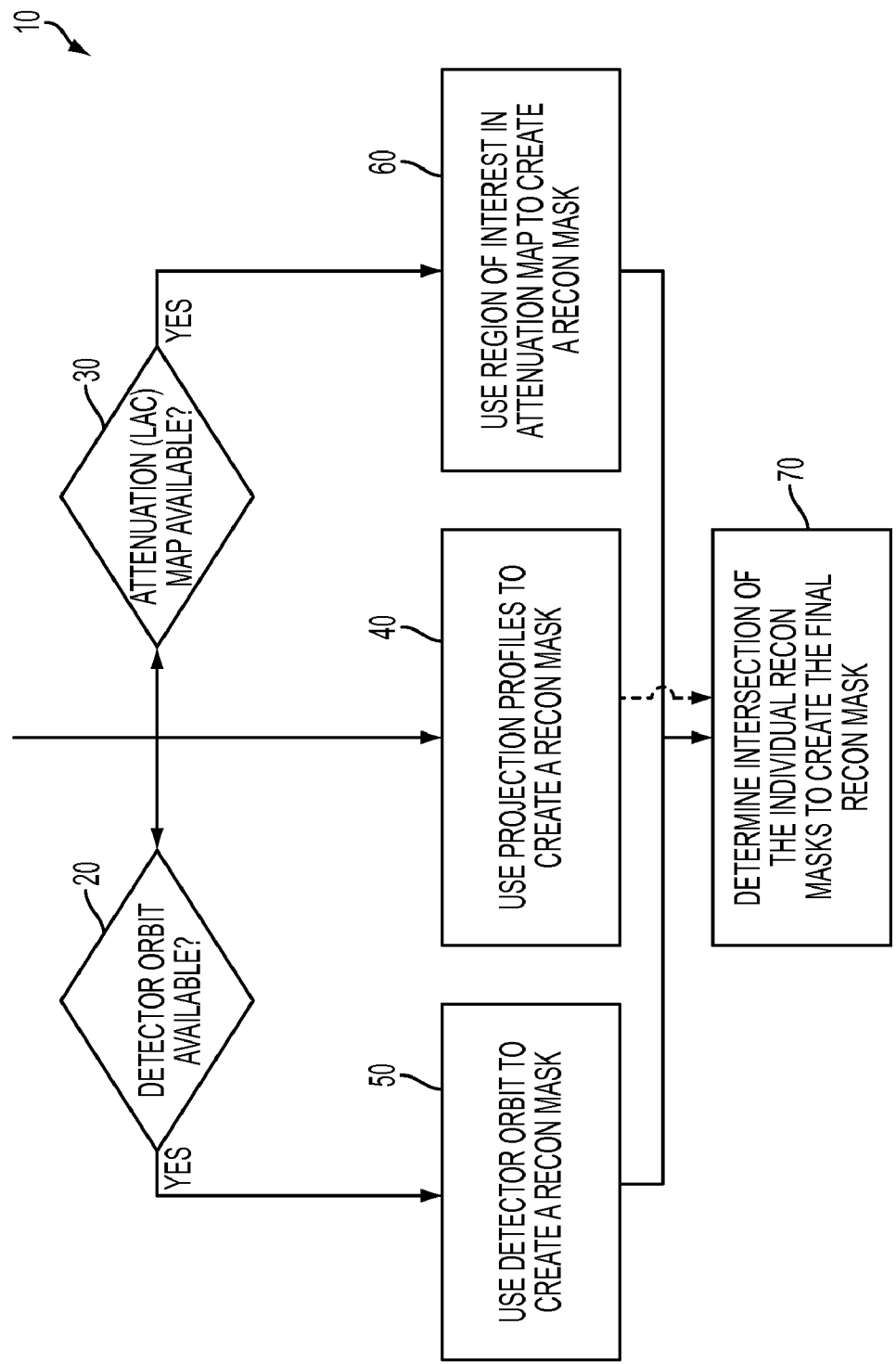
FIG. 1 illustrates a decisional flow diagram for creating a reconstruction support region.

The present invention will now be described and disclosed in greater detail. It is to be understood, however, that the disclosed embodiments are merely exemplary of the invention and that the invention may be embodied in various and alternative forms. Therefore, specific structural and/or functional details disclosed herein are not to be interpreted as limiting the scope of the claims, but are merely provided as an example to teach one having ordinary skill in the art to make and use the invention.

Tomographic projection images measure radioactive events emanating from an object of interest, e.g., a patient, from multiple view angles. The object of interest, e.g., a patient or portion of a patient, typically encompasses only a fraction (25-50%) of the Field of View (FOV) of a detector. However, iterative reconstruction techniques often reconstruct the entire FOV of a detector, including those regions that fall beyond the object of interest. As a result, iterative reconstruction techniques that reconstruct irrelevant portions of FOVs comprise inefficient uses of computational resources and time. Accordingly, the detailed description that follows describes methods for specifically confining iterative reconstruction to an object of interest, or region of interest within a FOV of a detector, which results in a more efficient use of time and computational resources.

Generally, the inventive methods calculate one or more reconstruction support regions that can be used in iterative reconstruction to reduce the computational resources required for the reconstruction. The methods can use one or more of the following to create a reconstruction support region:

1. Projection image data emanating from the object of interest, which is then demarcated from background noise. The extent of the foreground region is used to define a reconstruction support region.

2. The orbit of the detectors relative to an object or a point in space can be used to define a reconstruction support region. Such method can be particularly useful in the case of a non-circular orbits with automatic contouring when detectors rotate very close to an object of interest.

3. If an input Linear Attenuation Coefficient (LAC) map is present, the region of interest defined by such map also can be used to describe a reconstruction support region.

The use of the inventive reconstruction support regions provides several benefits:

1. The use of reconstruction support regions reduces the number of voxels that have to be reconstructed. Thus, only a portion of the full system matrix needs to be modeled. In this regard, the system matrix can be modeled either by pre-computing all elements of the matrix and storing them in a memory or in memory mapped files, or by performing operations on the projection and reconstructed images that mimic the application of the system matrix. Naturally, because a system matrix can be very large even with the use of limited reconstruction support regions, most implementations described herein employ this second approach. In either approach, however, the use of reconstruction support regions limits the computational resources that are required.

2. Where attenuation correction is applied to a reconstructed image in the form of an input map of linear attenuation coefficients (LAC), the system matrix must be modified to include the view-specific attenuations for each voxel in the reconstruction support region, which procedures can be time consuming. Accordingly, where a reconstruction support region is limited, the time and memory required to compute such view specific attenuations can be significantly reduced—at times by a factor of 2-4.

In the detailed description that follows, it should be understood that, for purposes of clarity, the exemplary embodiments have been described relative to computing reconstruction support regions for a cylinder oriented along an axial direction of a Field of View (FOV). In this regard, the length of such cylinder comprises the full axial extent of the FOV, but as can be appreciated by those having skill in the art, may be limited. Notwithstanding, in the description that follows, no attempt has been made to limit the axial length in the following examples because typical objects of interest, e.g., patients, are usually longer than the axial FOV.

It should also be appreciated that the transverse extent of the cylinder region can be defined using one or more, or a combination and/or intersection, of:

1. An estimate of the cylinder region in the projection images that contains data emanating from the cylinder;

2. An orbit of the detectors around the cylinder; and,

3. A region of interest corresponding to the cylinder and defined by an attenuation map of the cylinder, if such a map is available.

Also, it should be understood that the methods described herein can be implemented via computer software methods and utilize existing systems and data acquisition methods. Finally, it will be understood by those having ordinary skill in the art that while method steps described herein may be described as being performed in a sequential manner, depending upon the specific method step being performed, such step(s) may not be required to be performed in a sequential manner.

Referring now to the figures, FIG. 1 describes a logic scheme 10 for preparing a reconstruction support region according to the inventive methods. For purposes of clarity, logic 10 is described relative to a cylinder oriented along the axial direction of the FOV of a detector. Generally, a reconstruction support region according the invention can be prepared utilizing one or more of detector orbit data 20, attenuation correction data 30 or projection profiles 40 that describe the transverse extent of the cylinder. As can be seen, where detector orbit data 20 and/or attenuation correction data 30 is available, they can be used to prepare reconstruction support regions for the transverse extent of the cylinder, i e., reconstruction masks 50 and 60. Where detector orbit data 20 or attenuation correction data 30 are unavailable, projection profile data 40 can be used to prepare a reconstruction support region of the cylinder. As can be appreciated, where detector orbit data 20 and/or attenuation data 30 are available, their reconstruction masks can be combined or intersected with the mask created from projection profile data 40 to prepare a final reconstruction support mark or region 70 that describes the transverse extent of the cylinder.

Figure 2:
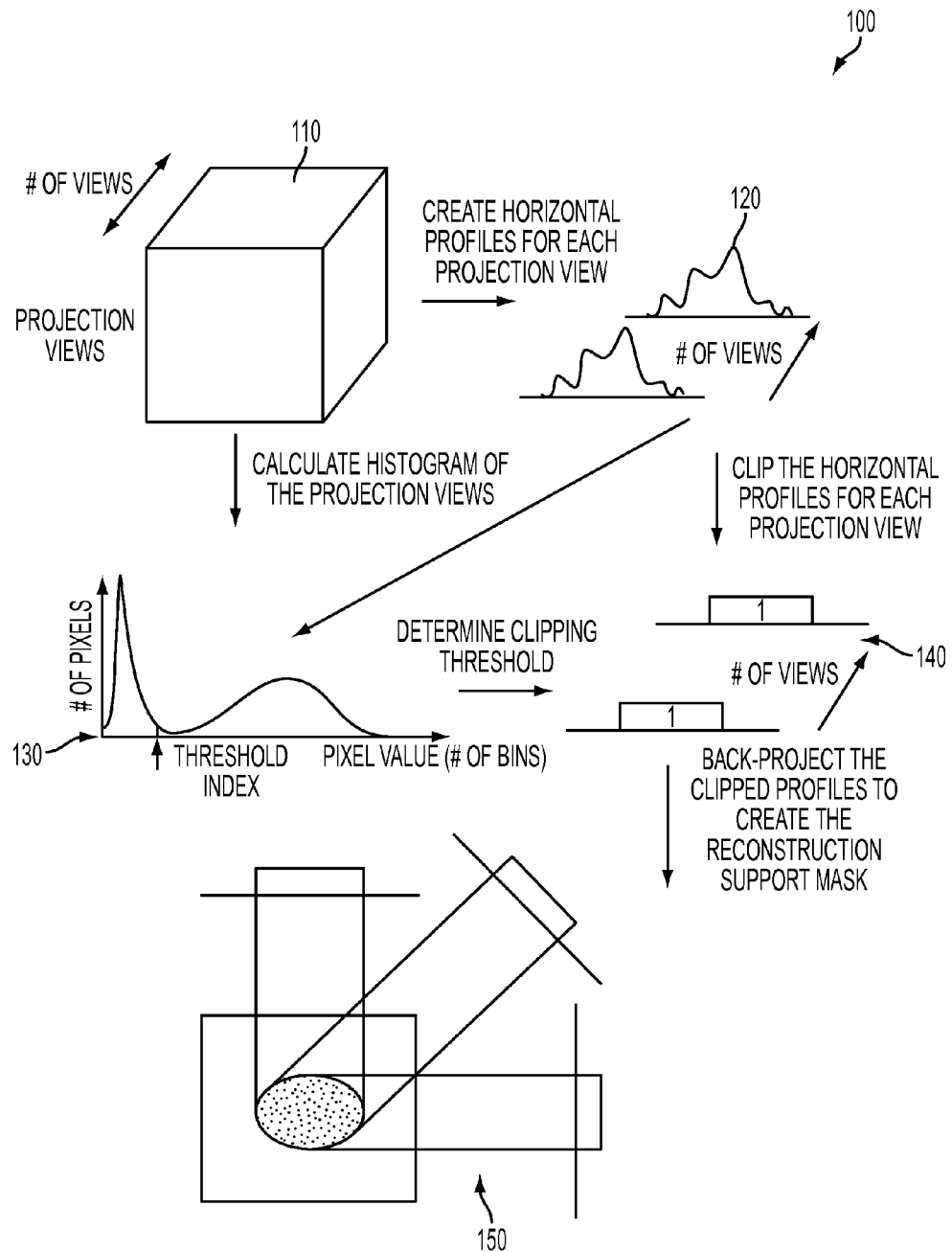
FIG. 2 is a schematic illustration/flow diagram illustrating a method for creating a reconstruction support region using projection images.

FIG. 2 describes a method 100 for preparing a reconstruction support region using projection images from a volume of projection images 110 to describe a transverse extent of a cylindrical reconstruction support region. According to the method, for each projection view in volume 110, a horizontal profile 120 of the object of interest, i.e., a cylinder, can be created by summing the projection view along the axial direction. The horizontal profile 120 can then be smoothed/filtered 130 using a uniform (box) filter to reduce noise. An interior extent of the horizontal profile can then be determined such that the regions inside and outside the horizontal profile can be described according to threshold values 140. The threshold is defined as an empirically determined fraction of the maximum value in the horizontal profile 120. A clipped profile, containing a value of 1 to describe that volume/area inside the extent and a value of 0 to describe that volume/area outside the extent, can then be created for each projection image. The clipped profiles can then be back-projected into the FOV using either a ray-driven or pixel-driven back-projection technique. The intersection of the back-projections can then be computed and expanded by a small number of pixels by repeated morphological dilations to prepare a reconstruction support region 150 substantially describing a transverse extent of the cylinder of interest within the FOV.

Figure 3:
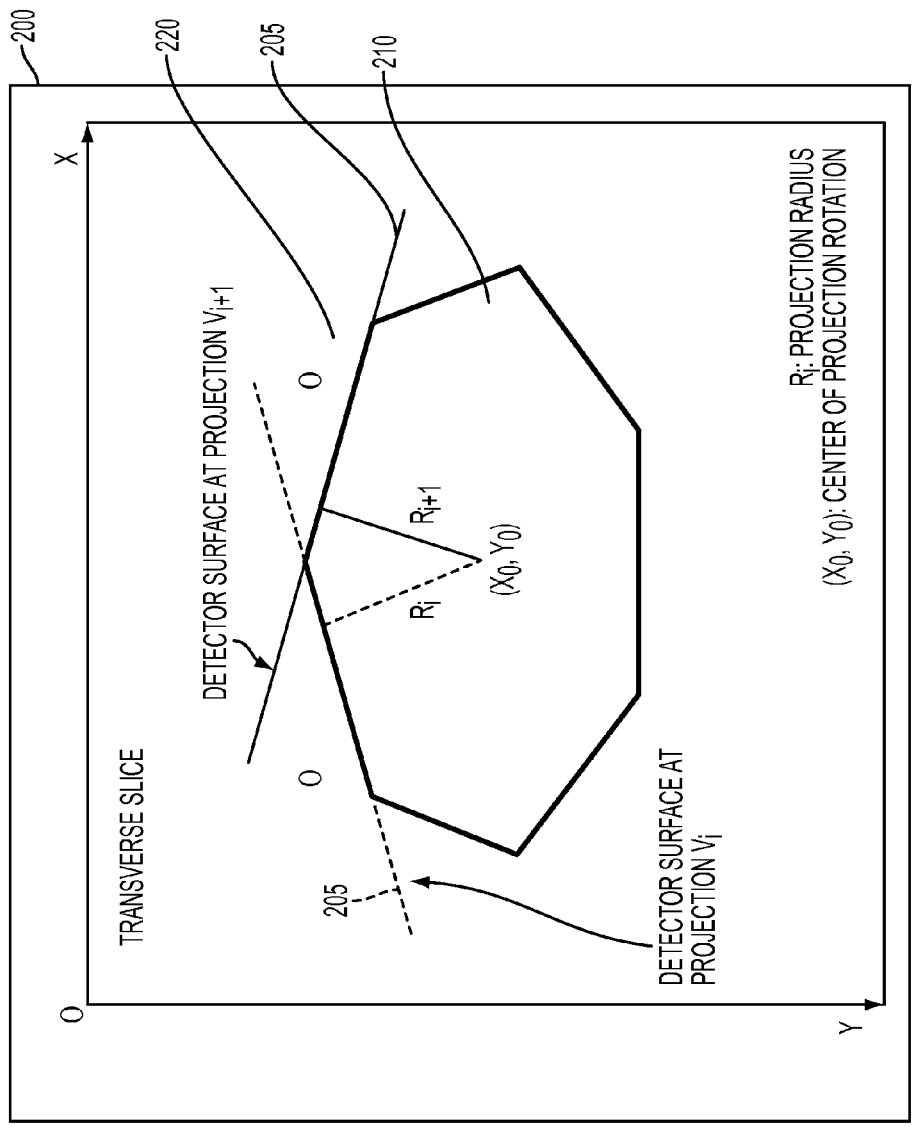
FIG. 3 is a schematic illustration of a method for creating a reconstruction support region using detector orbit data.

FIG. 3 describes a method 200 for preparing a reconstruction support region using detector orbit data. According to the method, during acquisition of projection images, e.g., from the location of detector surface 205 at projection view angle $V_i$ to the location of detector surface 205 at projection $V_{i+1}$, the view angles and the radial distances ($R_i$, $R_{i+1}$) of a detector from a center or origin of rotation ($X_o$, $Y_o$), can be recorded. This data can then be used to ascertain, for each projection view angle, the region of the FOV that is visible from the detector. That is, using detector view angle and radial distance information, data corresponding to region 210 of the FOV including the cylinder can be retained and used to prepare a reconstruction support region. By contrast, regions 220 of the FOV that lay behind the detector or beyond its transverse extent can be discarded. The intersection of the projection data corresponding to the retained regions 210 from each view can then be computed and expanded by a small number of pixels by repeated morphological dilations to prepare a reconstruction support region that substantially describes and encompasses the transverse extent of the cylinder. A reconstruction support region prepared in such manner can be particularly useful in instances wherein the projection images are acquired using non-circular orbits with automatic contouring because the detectors are typically passed as close to the object of interest as possible. Thus, the region encompassing a transverse extent of an object of interest can be described by the orbit and used to prepare a reconstruction support region.

Figure 4:
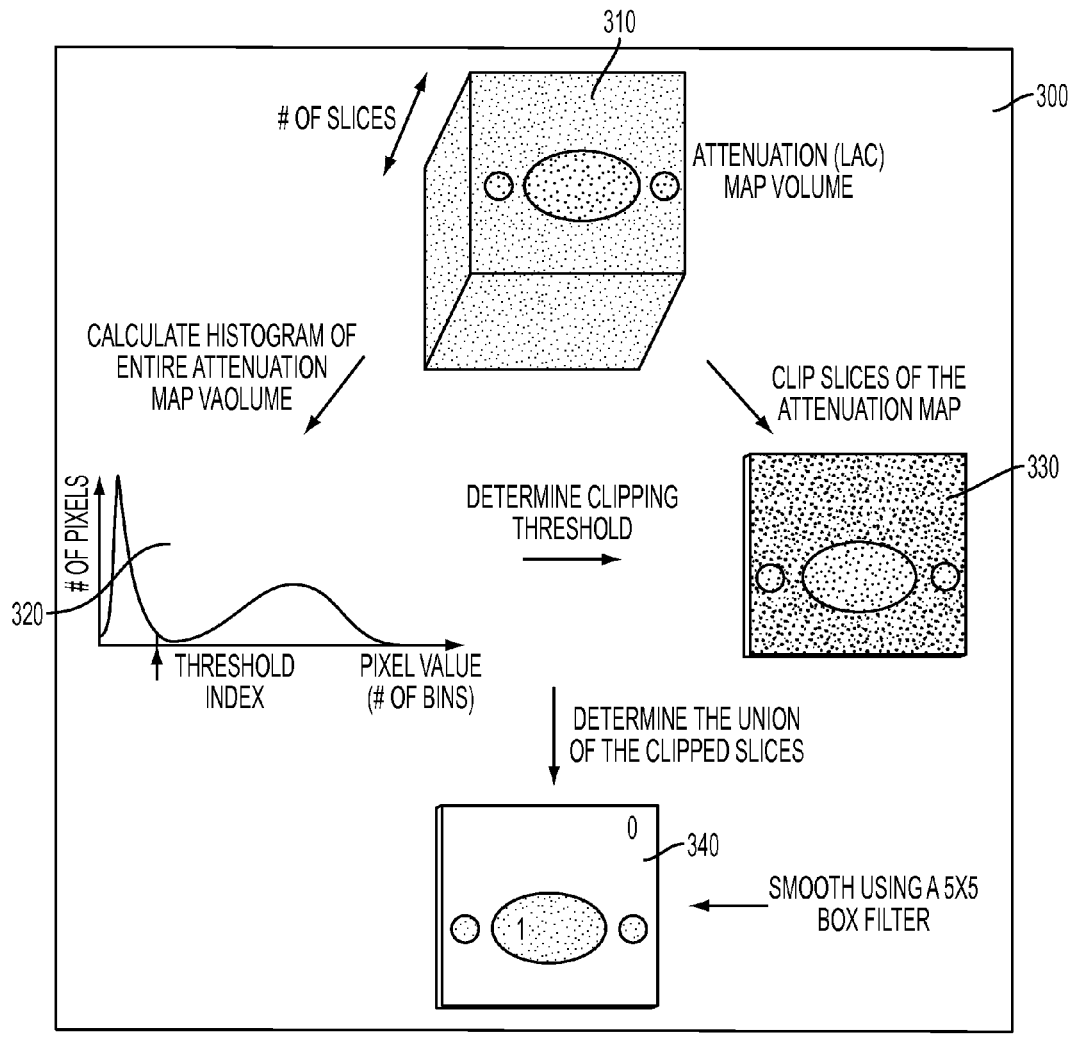
FIG. 4 is a schematic illustration/flow diagram of a method for creating a reconstruction support region using a LAC (Linear Attenuation Coefficient) map; and, FIG. 5 illustrates a flow diagram of an iterative reconstruction method using the reconstruction support regions described in FIGS. 2-4.

FIG. 4 describes a method 300 for preparing a reconstruction support region using attenuation correction data corresponding to an object of interest, e.g., Linear Attenuation Coefficient (LAC) map 310. The LAC map is typically available in the form of transverse slices of the object of interest that is registered with the reconstructed image. As shown in FIG. 4, using an LAC map 310 of an object of interest, e.g., a cylinder, each slice in the input LAC map is clipped 330 using a threshold computed from a histogram prepared from the histogram 320. The threshold is defined as an empirically determined fraction of the maximum value in the map. Voxel values in each slice that are greater than the threshold value can be set to 1 and the remaining voxel values set to 0. The clipped slices can then be combined, or intersected with one another, and smoothed using a 5×5 uniform (box) filter to expand the boundary of the pixels above the threshold value so as to create a reconstruction support region 340 that corresponds to the object of interest.

Figure 5:
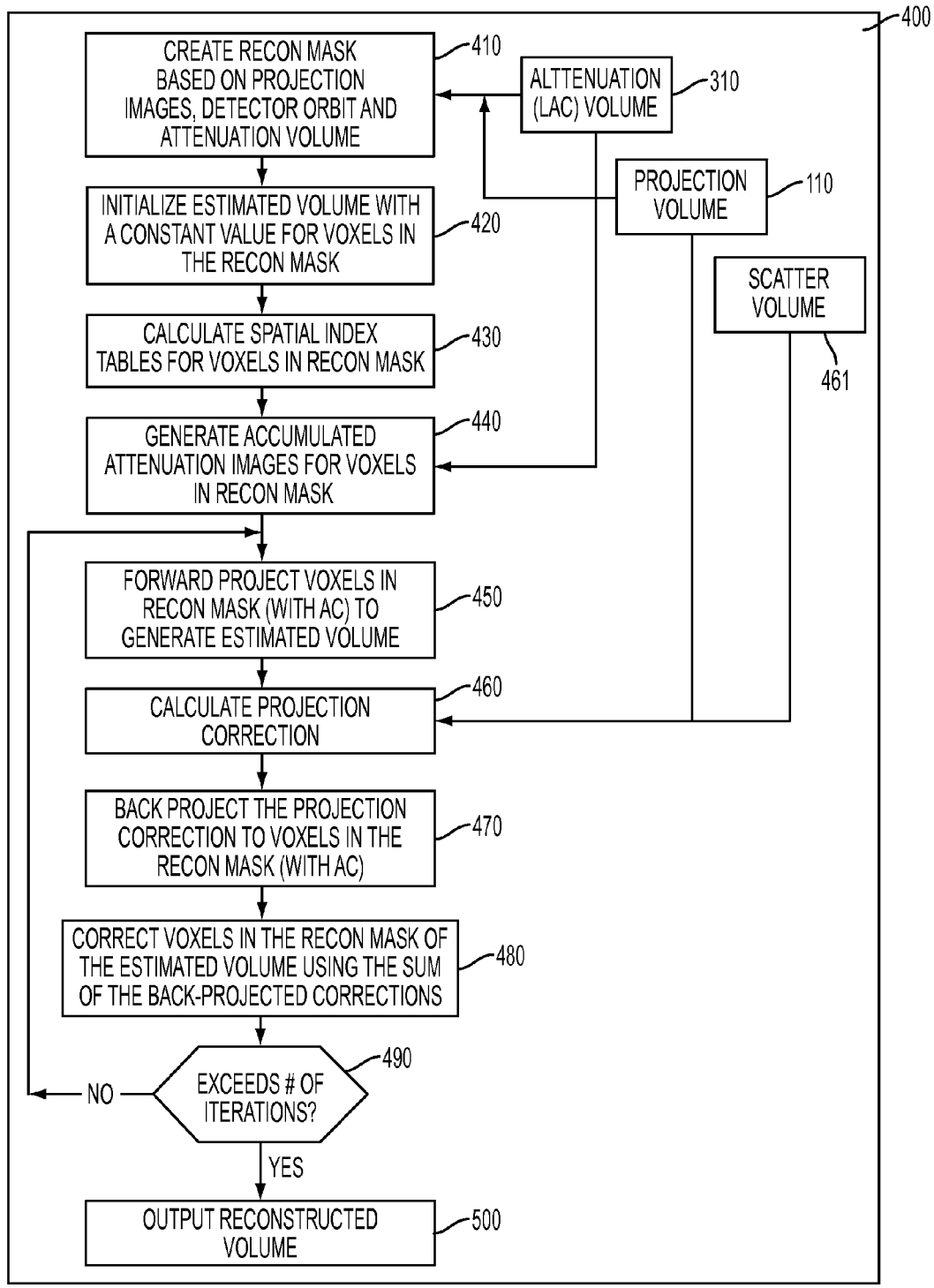

As shown in FIG. 5, in some embodiments of the method, each of reconstruction support regions 150, 210 and 340 can be then combined, or intersected with one another to prepare reconstruction support mask 410, which describes the final transverse extent of the cylinder. Reconstruction support mask 410 can be then used in an iterative reconstruction 400 of the cylinder. According to the iterative reconstruction method 400 described in FIG. 5, reconstruction support region 410 is prepared in an initialization phase of the reconstruction method 400 from the projection images, the orbit of the detectors and the input LAC map, if available. The current estimate is initialized 420 with a constant value inside the reconstruction support region (such as 1) and zero value outside the reconstruction support region. If an input LAC map 310 exists and attenuation correction is desired, the view-specific attenuations for each support voxel are calculated 430 for all views. For each iteration, for each view, the system matrix is modified 440 with the view-specific attenuation for all voxels in the reconstruction support mask, the support voxels of the current estimate are forward projected 450 by applying the system matrix, the projection correction is calculated 460 as the ratio between the acquired and estimated projection, and the projection correction for the voxels inside the reconstruction support region are back-projected 470 by applying the transpose of the system matrix. The projection correction 460 can take into account scatter volume data 461 to remove background. Thereafter, the support voxels of the current estimate are updated 480 using the sum of the back-projected corrections. At 490, it is determined whether the predefined number of iterations has been performed. If so, the reconstructed image volume is outputted at 500. Otherwise, the process returns to step 450 to execute another iteration.

Accordingly, it is seen that upon performing iterative reconstruction techniques using a reconstruction support region according to the inventive method, a savings in computational resources and time in which to perform such computations can be obtained. Generally, the savings in computational resources and time is inversely proportional to the size of the reconstruction support region. Typically, because the transverse extent of a cylindrical support region, a patient, covers between 25-50% of the transverse FOV, the amount of memory that is required to store and/or process the system matrix and/or the view specific attenuations can be reduced—typically between factors of 2-4. Similarly, the time required to apply the system matrix can also be reduced by a similar factors.

It should be appreciated by those having ordinary skill in the art that while the present invention has been illustrated and described in what is deemed to be the preferred embodiments, various changes and modifications may be made to the invention without departing from the spirit and scope of the invention. Therefore, it should be understood that the present invention is not limited to the particular embodiments disclosed herein.

What is claimed is:

1. A method for iterative reconstruction of tomographic images of an object of interest comprising:
   obtaining projection data in a field of view of a detector over a plurality of projection view angles, wherein said projection data includes data of said object;
   processing the projection data to prepare a projection reconstruction support region within said field of view, in which said object is located; and
   reconstructing a tomographic image of said object from projection data located in said reconstruction support region wherein said reconstruction is iterative and comprises:
   modifying a system matrix with view specific attenuations for all voxels in said reconstruction support region;
   projecting forward, support voxels provided by applying said system matrix;
   calculating projection correction as a ratio between an estimated projection and an actual projection;
   projection correction for voxels encompassed by the reconstruction support regions are back projected; and,
   summing back-projected corrections to update said support voxels.

2. The method of claim 1, wherein processing of said projection data comprises:
   preparing an object profile for each projection view angle;
   applying a threshold value to the object profile to obtain a clipped object profile; and back-projecting the clipped object profile to obtain a projection reconstruction support region corresponding to the object.

3. The method of claim 2, further comprising:
storing, for each projection view angle, a view angle and a distance of a detector surface from a center of rotation of a detector orbit;
calculating from said stored data a field of view reconstruction support region; and
using said field of view reconstruction support region to adjust said projection reconstruction support region.

4. The method of claim 2, further comprising adjusting said projection reconstruction support region with object attenuation coefficient data.

5. The method of claim 3, further comprising adjusting said projection reconstruction support region with object attenuation coefficient data.

6. The method of claim 5 wherein the object attenuation data is processed using a threshold value prior to being applied to said projection reconstruction support region.

7. The method of claim 6 wherein the object attenuation data is back-projected to describe an attenuation reconstruction support region that is combined with said projection reconstruction support region.

8. A method for iterative reconstruction of tomographic images of an object of interest comprising:
obtaining data corresponding to a field of view of a detector, the data corresponding to at least one of:
a projection image of the object of interest within the field of view over a plurality of view angles;
a plurality of locations of the detector relative to a predefined point defining an orbit; and
an attenuation coefficient map of the object of interest within the field of view;
processing the data to prepare a reconstruction support region corresponding to an object within the field of view; and
reconstructing an image of said object based on the reconstruction support region wherein said reconstruction further comprises:
modifying a system matrix with view specific attenuations for all voxels in said reconstruction support region;
projecting forward, support voxels provided by applying said system matrix;
calculating projection correction as a ratio between an estimated projection and an actual projection,
projection correction for voxels encompassed by the reconstruction support regions are back projected; and
summing back-projected corrections to update said support voxels.

9. The method of claim 8 wherein a plurality of projection images are combined to describe a volume encompassing the object of interest, the volume comprising the reconstruction support region.

10. The method of claim 8 wherein said orbit is used to describe a volume encompassing the object of interest, the volume comprising the reconstruction support region.

11. The method of claim 8 wherein a plurality of slices of attenuation data are combined to describe a volume encompassing the object of interest, the volume comprising the reconstruction support region.

12. The method of claim 8 wherein a plurality of projection images, said orbit, and a plurality of attenuation data slices each describe a volume encompassing the object of interest, and each of the volumes is intersected with one another to define a final reconstruction support region.

13. A method for iterative reconstruction of tomographic images of an object of interest comprising:
obtaining, from an initial scan of said object by a single photon emission tomography ("SPECT") device, projection data of said object in a field of view of a detector over a plurality of projection view angles;
processing said projection data to prepare a projection data reconstruction support region, in which said object is located;
obtaining, when available, detector orbit data to prepare a detector orbit reconstruction support region wherein said detector orbit data includes each detector view angle and a distance of a detector surface, having automatic contouring, from a center of rotation of a detector orbit for said each detector view angle;
using, when available, a linear attenuation coefficient map, derived from a secondary scan of said object, to prepare an attenuation data reconstruction support region;
preparing a final reconstruction support region from at least one of said projection data reconstruction support region, said detector orbit reconstruction support region, and said attenuation data reconstruction support region; and
reconstructing a tomographic image from said final reconstruction support mask.

14. The method of claim 13, wherein said projection data further comprises:
preparing an object profile for each detector view angle;
applying a threshold value to said object profile to obtain a clipped object profile; and
back-projecting said clipped object profile.

15. The method of claim 13, wherein said linear attenuation coefficient map derived from a secondary scan of said object.

16. The method of claim 13, wherein said reconstructing comprises an iterative reconstruction process, wherein;
a system matrix is modified with view specific attenuations for all voxels in said reconstruction support region;
support voxels provided by applying the system matrix are projected forward;
projection correction is calculated as a ratio between an estimated projection and an actual projection;
projection correction for voxels encompassed by the reconstruction support regions are back projected; and,
the sum of the back-projected corrections are used to update the support voxels.

\* \* \* \* \*